H. DE F. ROBBINS.
VEHICLE SIGNAL.
APPLICATION FILED JAN. 22, 1916.
1,218,320.
Patented Mar. 6, 1917.
2 SHEETS—SHEET 1.
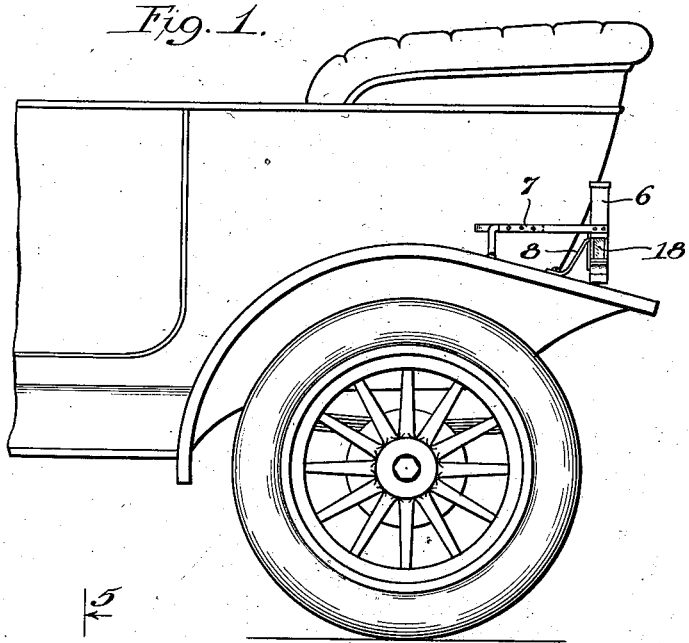
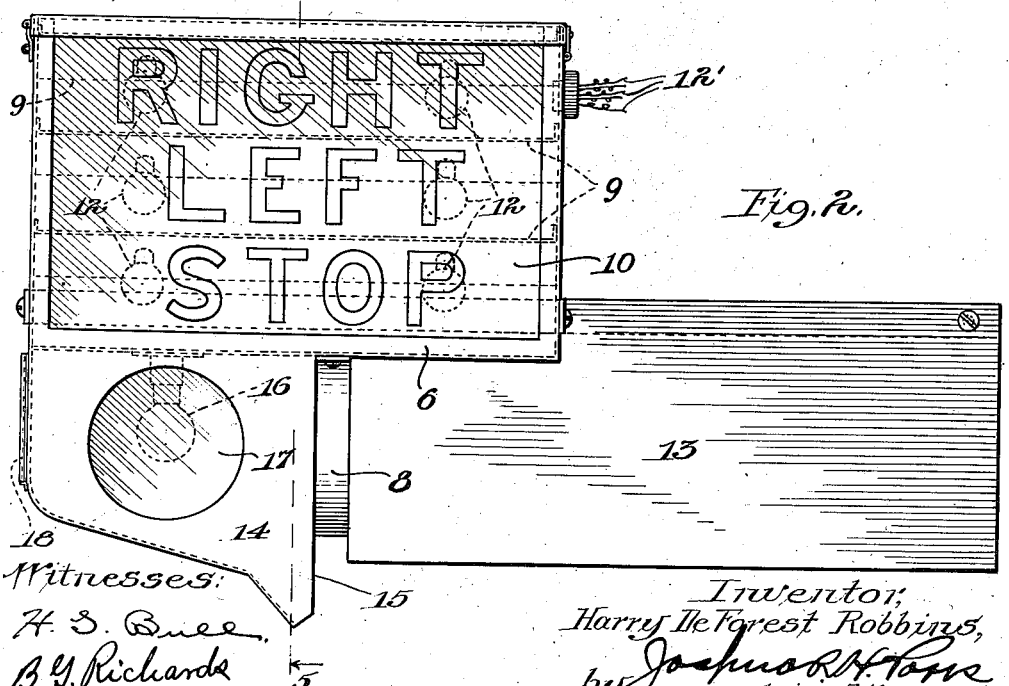

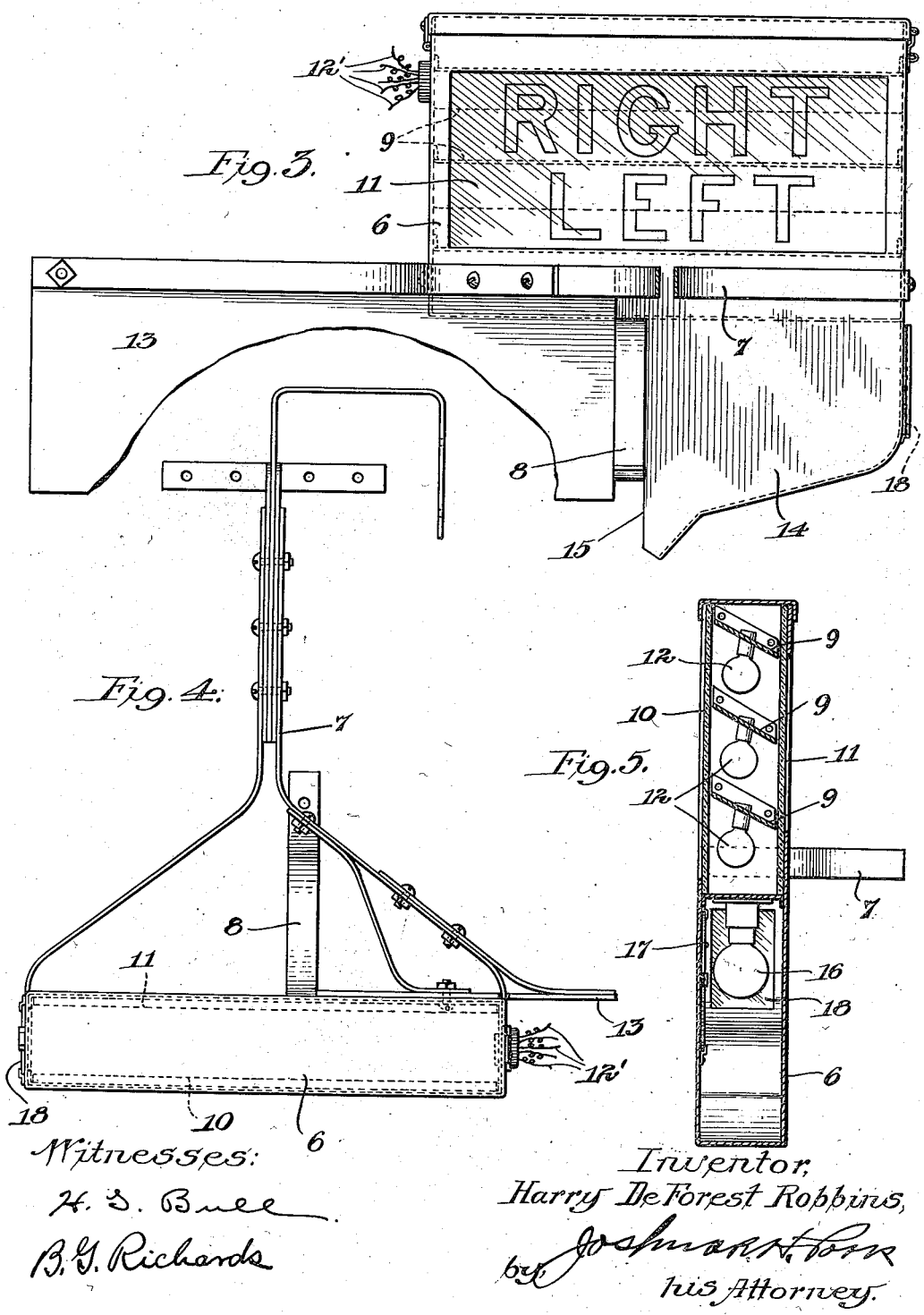

UNITED STATES PATENT OFFICE.

HARRY DE FOREST ROBBINS, OF CHICAGO, ILLINOIS, ASSIGNOR OF ONE-HALF TO EUGENE S. ROBBINS, OF CHICAGO, ILLINOIS.

VEHICLE-SIGNAL.

1,218,320.     Specification of Letters Patent.     Patented Mar. 6, 1917.

Application filed January 22, 1916. Serial No. 73,602.

*To all whom it may concern:*

Be it known that I, HARRY DE FOREST ROBBINS, a citizen of the United States, and a resident of the city of Chicago, county of Cook, and State of Illinois, have invented certain new and useful Improvements in Vehicle-Signals, of which the following is a specification.

My invention relates to improvements in vehicle signals and more especially to automobile signals and has for its object the provision of an improved signal for vehicles by means of which the driver thereof may readily indicate intentions as to travel.

The invention consists in the combinations and arrangements of parts hereinafter described and claimed.

The invention will be best understood by reference to the accompanying drawings forming a part of this specification, and in which, Figure 1 is a side view of the rear portion of an automobile equipped with a signal embodying my invention, Fig. 2, an enlarged rear elevation of the signal, Fig. 3, an enlarged front elevation of the same with portions broken away, Fig. 4, an enlarged top plan view of the signal detached, and Fig. 5, a vertical section taken on line 5—5 of Fig. 2.

The preferred form of construction as illustrated in the drawings comprises a sheet metal casing 6 provided with brackets 7 and 8 by means of which it is secured at one side of the automobile just above one of the rear mud guards of the automobile and so as to be visible from both the front and the rear thereof. The interior casing 6 is divided into compartments by three horizontal forwardly and rearwardly inclined partitions 9, said partitions being arranged to form three compartments opening to the rear of the casing and two compartments opening to the front thereof. The rear of the casing is covered by a red or ruby glass sign plate 10 and the front thereof is covered by a similar sign plate 11. The plate 10 has the three words "Right", "Left" and "Stop" arranged thereon opposite the respective compartments in casing 6 and the plate 11 has the words "Right" and "Left" arranged in front of the two upper compartments as indicated. Electric light bulbs 12 are arranged in the different compartments of the casing 6 and controlled by means of suitable circuits through wires 12' as will be readily understood.

By this arrangement it will be observed that the excitation of the lights in the different compartments will readily indicate both to those in front of the vehicle and to the rear thereof the intentions of the driver thereof.

A license number plate 13 is arranged below and at one side of casing 6 and a light casing 14 is arranged under the other side, said casing being open on its inner side 15 to project light onto plate 13. The casing 14 is equipped with an ordinary electric light bulb 16 controlled through electric wires 12' as will be readily understood. Casing 14 is provided in its rear wall with a red glass 17 and at its outer side wall with a green glass 18 to constitute proper rear and side signal lights for the vehicle.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination of a casing arranged to be mounted at one side of a vehicle and visible both front and rear; horizontal forwardly and rearwardly inclined partitions in said casing dividing the same into compartments; lights in said compartments; means for controlling said lights; and translucent sign plates over the front and rear of said compartments, substantially as described.

2. The combination of a casing arranged to be mounted at one side of a vehicle and visible both front and rear; horizontal forwardly and rearwardly inclined partitions in said casing dividing the same into compartments, there being three compartments opening at the rear and two at the front; lights in said compartments; means for controlling said lights; and translucent sign plates over the front and rear of said compartments, substantially as described.

In testimony whereof I have signed my name to this specification in the presence of two subscribing witnesses.

HARRY DE FOREST ROBBINS.

Witnesses:
JOSHUA R. H. POTTS,
HELEN F. LILLIS.